(12) United States Patent
Kang et al.

(10) Patent No.: US 12,275,058 B1
(45) Date of Patent: Apr. 15, 2025

(54) DEVICES AND METHODS FOR CONTROLLABLE FORGING OF FORMING FLOW LINE OF COMPLEX-SHAPED COMPONENT

(71) Applicant: SOUTHWEST TECHNOLOGY AND ENGINEERING RESEARCH INSTITUTE, Chongqing (CN)

(72) Inventors: Feng Kang, Chongqing (CN); Qiang Chen, Chongqing (CN); Feiyue Zhang, Chongqing (CN); Jun Lin, Chongqing (CN); Yanbin Wang, Chongqing (CN); Juncen Qu, Chongqing (CN)

(73) Assignee: SOUTHWEST TECHNOLOGY AND ENGINEERING RESEARCH INSTITUTE, Chongqing (CN)

( * ) Notice: Subject to any disclaimer, the term of this patent is extended or adjusted under 35 U.S.C. 154(b) by 0 days.

(21) Appl. No.: 18/963,459

(22) Filed: Nov. 27, 2024

(30) Foreign Application Priority Data

Aug. 22, 2024 (CN) .......................... 202411157939.9

(51) Int. Cl.
| | |
|---|---|
| *B21J 13/02* | (2006.01) |
| *B21J 5/00* | (2006.01) |
| *B21J 9/02* | (2006.01) |
| *B21J 9/18* | (2006.01) |
| *B21J 13/14* | (2006.01) |
| *F16F 7/00* | (2006.01) |
| *F16F 9/00* | (2006.01) |

(Continued)

(52) U.S. Cl.
CPC ................. *B21J 5/008* (2013.01); *B21J 9/02* (2013.01); *B21J 9/18* (2013.01); *B21J 13/02* (2013.01); *B21J 13/14* (2013.01); *F16F 7/00* (2013.01); *F16F 9/003* (2013.01); *B21D 24/02* (2013.01); *B30B 15/0076* (2013.01)

(58) Field of Classification Search
CPC ....... B21J 5/008; B21J 9/02; B21J 9/18; B21J 13/00; B21J 13/02; B21J 13/14
See application file for complete search history.

(56) References Cited

U.S. PATENT DOCUMENTS

| | | | | |
|---|---|---|---|---|
| 2,139,591 | A | * 12/1938 | Jimenez | .................... F16F 7/00 188/129 |
| 2011/0283478 | A1 | * 11/2011 | Berry | ........................ F16F 7/00 16/68 |

FOREIGN PATENT DOCUMENTS

| | | | |
|---|---|---|---|
| CN | 110813833 A | * | 2/2020 |
| CN | 113803401 A | * | 12/2021 |
| CN | 114833294 A | * | 8/2022 |

(Continued)

*Primary Examiner* — Jared O Brown
(74) *Attorney, Agent, or Firm* — Runzhi Lai

(57) ABSTRACT

The present disclosure provides a device and a method for controllable forging of a forming flow line of a complex-shaped component. The device includes a frame, a shaping unit, a cushioning unit, and a cleaning unit, and the frame is used to mount and fix the shaping unit, the cushioning unit, and the cleaning unit; the shaping unit is used to improve a shaping capacity of processed parts; the cushioning unit is used to reduce a vibration in a metal shaping process to avoid an impact on the shaping of the metal; the cleaning unit is used to clean up a surface of a mold after shaping; when the metal is put into the mold, the metal is extruded and shaped through the shaping unit, and at the same time, the cushioning unit is used to offset the vibration generated by the shaping unit during the shaping process.

20 Claims, 7 Drawing Sheets

(51) Int. Cl.
*B21D 24/02* (2006.01)
*B30B 15/00* (2006.01)

(56) References Cited

FOREIGN PATENT DOCUMENTS

| | | | |
|---|---|---|---|
| CN | 116460211 A | * | 7/2023 |
| CN | 117123714 A | * | 11/2023 |
| CN | 118595364 A | * | 9/2024 |
| CN | 118663836 A | * | 9/2024 |

* cited by examiner

DEVICES AND METHODS FOR CONTROLLABLE FORGING OF FORMING FLOW LINE OF COMPLEX-SHAPED COMPONENT

CROSS-REFERENCE TO RELATED APPLICATIONS

This application claims priority of Chinese Patent Application No. 202411157939.9, filed on Aug. 22, 2024, the entire contents of each of which are incorporated herein by reference.

TECHNICAL FIELD

The present disclosure relates to the field of precision plastic molding technology, and in particular relates to a device and a method for controllable forging of a forming flow line of a complex-shaped component.

BACKGROUND

Complex-shaped components are extensively used across various manufacturing industries. These components often serve as main load-bearing parts, performing rotational movements over extended periods and enduring complex stresses in diverse environments. This places high demands on their mechanical and fatigue properties. Typically, a forging process for complex-shaped components involves die forging a billet, followed by machining into finished parts. Alternatively, a segmented manufacturing approach is used, where individual sub-structural parts are created and subsequently assembled through welding. Both methods are characterized by process complexity, lengthy manufacturing timelines, challenges in achieving precise control, low manufacturing efficiency, reduced material utilization, and high costs. Most critically, the internal metal flow within components is disrupted, significantly impacting their mechanical and fatigue properties.

During the forging of complex-shaped components, the interaction and relative movement between the mold and the billet generate substantial impacts and vibrations. These vibrations not only reduce the lifespan and precision of the mold but also threaten the stable operation of equipment, potentially leading to safety incidents. Additionally, especially in high-temperature forging environments, large amounts of smoke and dust are produced. This pollution contaminates the production environment, poses health risks to operators, and may damage equipment, ultimately reducing product quality.

Therefore, a device and a method for controllable forging of a forming flow line of a complex-shaped component are provided to help mitigate safety hazards in the forging process and improve the processing quality of complex-shaped components.

SUMMARY

One of the embodiments of the present disclosure provides a device for controllable forging of a forming flow line of a complex-shaped component, comprising: a frame, a shaping unit, a cushioning unit, and a cleaning unit; wherein the frame is placed on a horizontal base, the shaping unit is slidably mounted on the frame, the cushioning unit is fixedly mounted on an upper surface of one end of the frame that is close to the horizontal base, the cushioning unit is fixedly connected with the shaping unit, and the cleaning unit is fixedly connected with the shaping unit and the cushioning unit, respectively.

In some embodiments, the shaping unit includes a telescopic motor, a motorized telescopic rod, and an extrusion block; a fixed end of the telescopic motor is fixedly mounted on a surface of one end of the frame that is away from the horizontal base, a telescopic end of the telescopic motor is fixedly connected with a fixed end of the motorized telescopic rod, and a telescopic end of the motorized telescopic rod is fixedly connected with the extrusion block.

In some embodiments, the shaping unit includes a mold and a work table; the mold is fixedly mounted on the work table, and a surface of one end of the work table that is close the horizontal base is fixedly connected with the cushioning unit, and a surface of one end of the work table that is away from the horizontal base is fixedly mounted with the cleaning unit.

In some embodiments, a plurality of sets of through holes are uniformly opened on an inner surface of the mold.

In some embodiments, the shaping unit includes a vertical plate, a hydraulic rod, and a clamping block; the vertical plate is vertically fixedly mounted on the surface of the end of the work table that is away from the horizontal base; a fixed end of the hydraulic rod is fixedly mounted on a surface of a side of the vertical plate that is close to the mold; a telescopic end of the hydraulic rod is fixedly connected with the clamping block, and the clamping block is slidingly connected with the mold.

In some embodiments, the shaping unit includes a lifting plate and a memory spring; the lifting plate is placed on an upper surface of one end of the mold that is close to the work table, the mold is provided with a rectangular slot at a bottom, the memory spring is disposed in the rectangular slot, one end of the memory spring is fixedly connected with the mold, the other end of the memory spring is fixedly connected with a lower surface of the lifting plate, and the memory spring is electrically connected with the cushioning unit.

In some embodiments, the cushioning unit includes a connecting rod, a cylinder body, and a profiled block; one end of the connecting rod is fixedly connected with the surface of the end of the work table that is close to the horizontal base, the other end of the connecting rod extends into an interior of the cylinder body and is fixedly connected with the profiled block, and the cylinder body is fixedly mounted on the upper surface of the end of the frame that is close to the horizontal base.

In some embodiments, a material of the profiled block is a magnet.

In some embodiments, the cushioning unit includes a half gear; a plurality of sets of teeth are disposed on an inner surface of the profiled block, and the profiled block is connected with the half gear by engaging the teeth.

In some embodiments, the cushioning unit includes a round rod; the half gear is fixedly connected with one end of the round rod, the round rod is rotationally mounted on the cylinder body, and the round rod is fixedly connected with the cleaning unit.

In some embodiments, the cushioning unit includes a coil and an electromagnet; the cylinder body includes an inner cylinder and an outer cylinder, the coil is uniformly wrapped around an outer surface of the inner cylinder, and the electromagnet is fixedly mounted on an inner surface of one end of the inner cylinder that is close to the horizontal base, the electromagnet is electrically connected with one end of the coil, and the other end of the coil is electrically connected with the memory spring.

In some embodiments, the cushioning unit includes a spring cartridge; one end of the spring cartridge is fixedly connected with the surface of the end of the work table that is close to the horizontal base, and the other end of the spring cartridge is fixedly connected to the upper surface of the end of the frame that is close to the horizontal base.

In some embodiments, the cleaning unit includes a long rod, an annular disk, and a mounting box; one end of the long rod is fixedly connected with the round rod disposed on an exterior of the cylinder body, and the other end of the long rod extends into the mounting box and is fixedly connected with the annular disk disposed in the mounting box, the long rod is rotationally connected with the mounting box, and the mounting box is fixedly mounted on the upper surface of the end of the frame that is close to the horizontal base.

In some embodiments, the cleaning unit includes a limiting plate; the mounting box is provided with a slot on one side away from the horizontal base, and the limiting plate is fixedly mounted on the slot of the mounting box.

In some embodiments, the cleaning unit includes a straight rod, a mobile rod and a limiting cylinder; the mobile rod is slidably mounted in the limiting cylinder, the limiting cylinder is fixedly mounted on the limiting plate, and the annular disk is rotationally connected to one end of the mobile rod through the straight rod.

In some embodiments, the cleaning unit includes an air box and a push plate; the air box is fixedly mounted on the surface of the end of the work table that is away from the horizontal base; the other end of the mobile rod extends into the air box and is fixedly connected with the push plate; and the push plate is slidably mounted into the air box.

In some embodiments, a diameter of the annular disk is the same as a maximum amount of travel of the push plate.

In some embodiments, the cleaning unit includes a switch and a refrigeration plate; the switch is fixedly mounted in an inner wall of the air box that is parallel to a vertical direction, and the refrigeration plate is fixedly mounted in another inner wall of the air box that is parallel to the vertical direction, the switch being electrically connected with the refrigeration plate.

In some embodiments, the air box is connected to an interior of the mold in conduction through a pipe, the pipe being provided with a plurality of sets of check valves, the check valves being disposed on a surface of one end of the air box that is away from the horizontal base.

One of the embodiments of the present disclosure provides a method for controllable forging of a forming flow line of a complex-shaped component, comprising: wrapping a metal to be forged in a cavity of a mold for molding, the metal to be forged being heated prior to molding and maintained at an initial forging temperature for a predetermined period of time; controlling a hydraulic rod to extend to drive a clamping block to clamp the metal to be forged in the mold, starting a telescopic motor to drive a motorized telescopic rod to move to a top of the mold, and the motorized telescopic rod extending to drive an extrusion block to extrude the metal to be forged to obtain a shaped metal, performing shock absorption on a shaping unit by a cushioning unit during an extrusion process; removing and cooling the shaped metal; and cleaning impurities and dust of the cooled metal through a cleaning unit.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering denotes the same structure, wherein.

Figure 1:
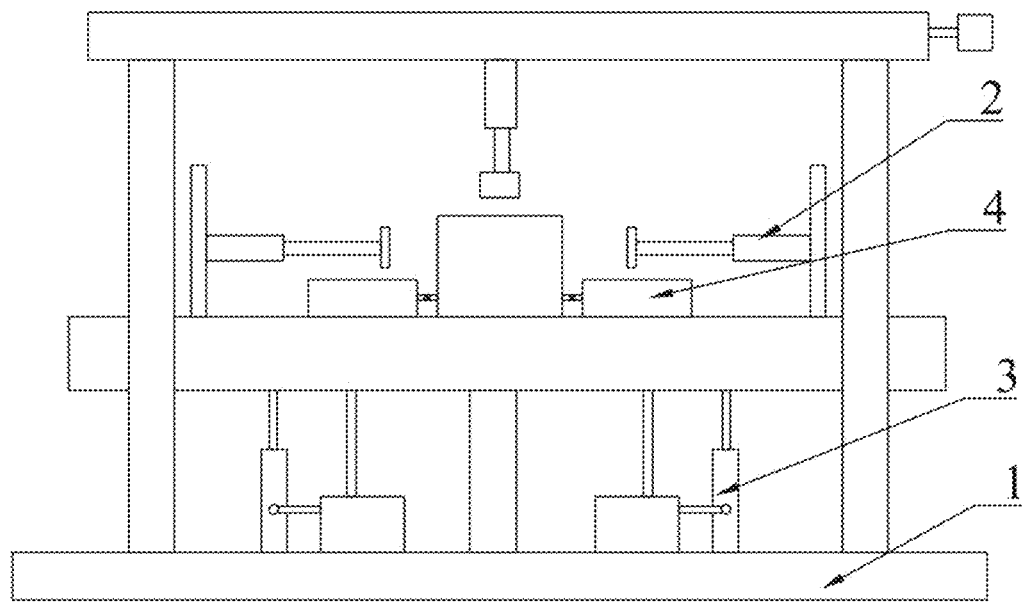
FIG. 1 is a schematic diagram of an overall structure of a device for controllable forging of a forming flow line of a complex-shaped component according to some embodiments of the present disclosure.

In the figures: 1, a frame; 2, a shaping unit; 21, a telescopic motor; 22, a motorized telescopic rod; 23, an extrusion block; 24, a mold; 241, through holes; 25, a work table; 26, a vertical plate; 27, a hydraulic rod; 28, a clamping block; 29, a lifting plate; 210, a memory spring; 3, a cushioning unit; 31, a connecting rod; 32, a cylinder body; 33, a profiled block; 34, a half gear; 35, a coil; 36, an electromagnet; 37, a round rod; 38, a spring cartridge; 4, a cleaning unit; 41, a long rod; 42, an annular disk; 43, a mounting box; 44, a limiting plate; 45, a straight rod; 46, a mobile rod; 47, a limiting cylinder; 48, an air box; 49, a push plate; 410, a switch; 411, a refrigeration plate; 412, check valves.

DETAILED DESCRIPTION

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of steps and elements, these steps and elements do not constitute an exclusive list, and the method or device may also include other steps or elements.

FIG. 1 is a schematic diagram of an overall structure of a device for controllable forging of a forming flow line of a complex-shaped component according to some embodiments of the present disclosure.

In some embodiments, the device for controllable forging of a forming flow line of a complex-shaped component may include a frame 1, a shaping unit 2, a cushioning unit 3, and a cleaning unit 4. Referring to FIG. 1, the frame 1 is placed on a horizontal base, the shaping unit 2 is slidably mounted on the frame 1, the cushioning unit 3 is fixedly mounted on an upper surface of one end of the frame 1 that is close to the horizontal base, the cushioning unit 3 is fixedly connected with the shaping unit 2, and the cleaning unit 4 is fixedly connected with the shaping unit 2 and the cushioning unit 3, respectively.

The frame 1 is used to install and fix the shaping unit 2, the cushioning unit 3 and the cleaning unit 4; the shaping unit 2 is used to improve a shaping capacity of processed parts, so as to make a flow line of a metal distributed in a shape-conforming manner; the cushioning unit 3 is used to reduce the vibration in the process of molding the metal to avoid the impact of vibration on the molding of the metal; the cleaning unit 4 is used to clean the shaping unit 2 after molding; and the cleaning unit 4 is used to clean dust impurities after metal processing.

The frame 1 is used for mounting and fixing the shaping unit 2, the cushioning unit 3 and the cleaning unit 4. As shown in FIG. 1, the frame 1 may include two platforms parallel to the horizontal base and support frames perpendicular to the horizontal base, and the support frames may be used to connect the two platforms. The horizontal base refers to a load-bearing base that is parallel to a horizontal plane, for example, the horizontal base may be a horizontal tabletop, a floor, or the like. In some embodiments, the frame 1 is placed on the horizontal base.

The shaping unit 2 is used to improve a shaping capacity of the processed part so that the flow line of the metal may be distributed in a shape-conforming manner. As shown in FIG. 1, the shaping unit 2 is slidably mounted on the frame 1.

In some embodiments, the shaping unit 2 includes a telescopic motor 21, a motorized telescopic rod 22, and an extrusion block 23.

Figure 2:
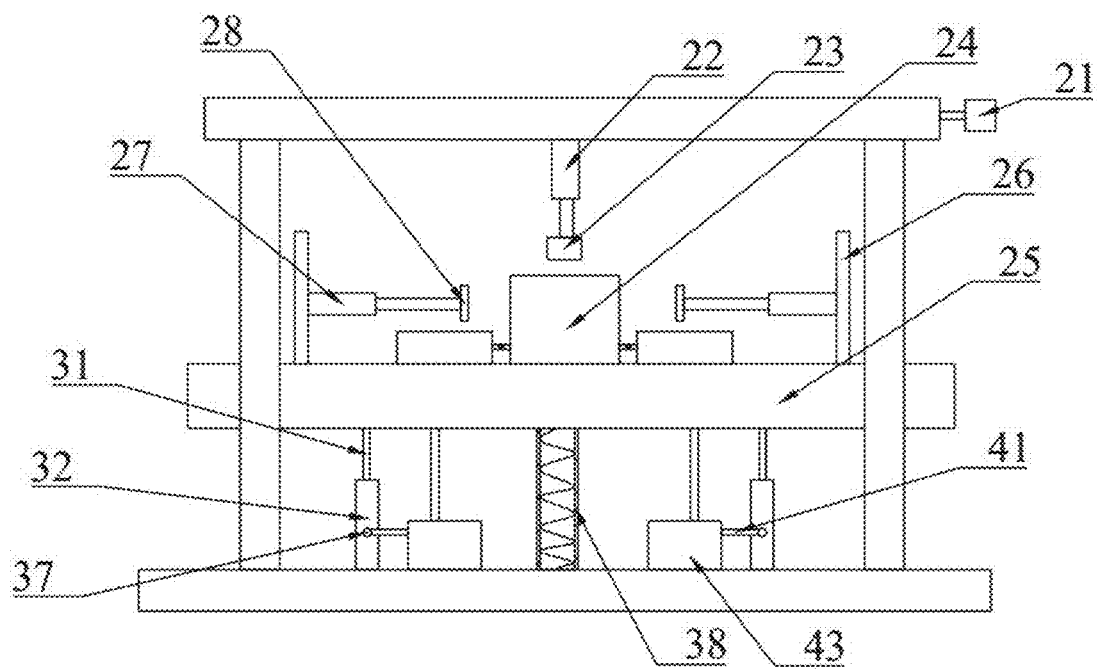
FIG. 2 is a front view of a structure of a device for controllable forging of a forming flow line of a complex-shaped component according to some embodiments of the present disclosure.

FIG. 2 is a front view of a structure of a device for controllable forging of a forming flow line of a complex-shaped component according to some embodiments of the present disclosure. Referring to FIG. 2, a fixed end of the telescopic motor 21 is fixedly mounted on a surface of one end of the frame 1 that is away from the horizontal base, a telescopic end of the telescopic motor 21 is fixedly connected with a fixed end of the motorized telescopic rod 22, and a telescopic end of the motorized telescopic rod 22 is fixedly connected with the extrusion block 23.

The telescopic motor 21 is used to drive the motorized telescopic rod 22. The motorized telescopic rod 22 may move horizontally driven by the telescopic motor 21. The telescopic end of the motorized telescopic rod 22 is fixedly connected to the extrusion block 23 and drives the extrusion block 23 to move in a vertical direction by telescoping. The extrusion block 23 may shape the metal processed part.

In some embodiments of the present disclosure, after the telescopic motor 21 is activated thereby driving the motorized telescopic rod 22 to move to directly above a mold 24, the motorized telescopic rod 22 extends out to push the extrusion block 23 to extrude and shape a metal processed part, which makes the metal deformation always in a compressive stress state in three directions, thus improving the plasticity of the metal and reducing an internal tensile stress of the processed part. The aforementioned compressive stresses in three directions include a compressive stress in a vertical direction when the metal processed part is extruded by the extrusion block 23, and two compressive stresses in two horizontal directions corresponding to two clamping blocks 28 when the metal processed part is extruded by the two clamping blocks 28.

In some embodiments, the shaping unit 2 may include a mold 24 and a work table 25. Referring to FIG. 1 and FIG. 2, the mold 24 is fixedly mounted on the work table 25, and a surface of one end of the work table 25 that is close the horizontal base is fixedly connected with the cushioning unit 3, and a surface of one end of the work table 25 that is away from the horizontal base is fixedly mounted with the cleaning unit 4.

Figure 3:
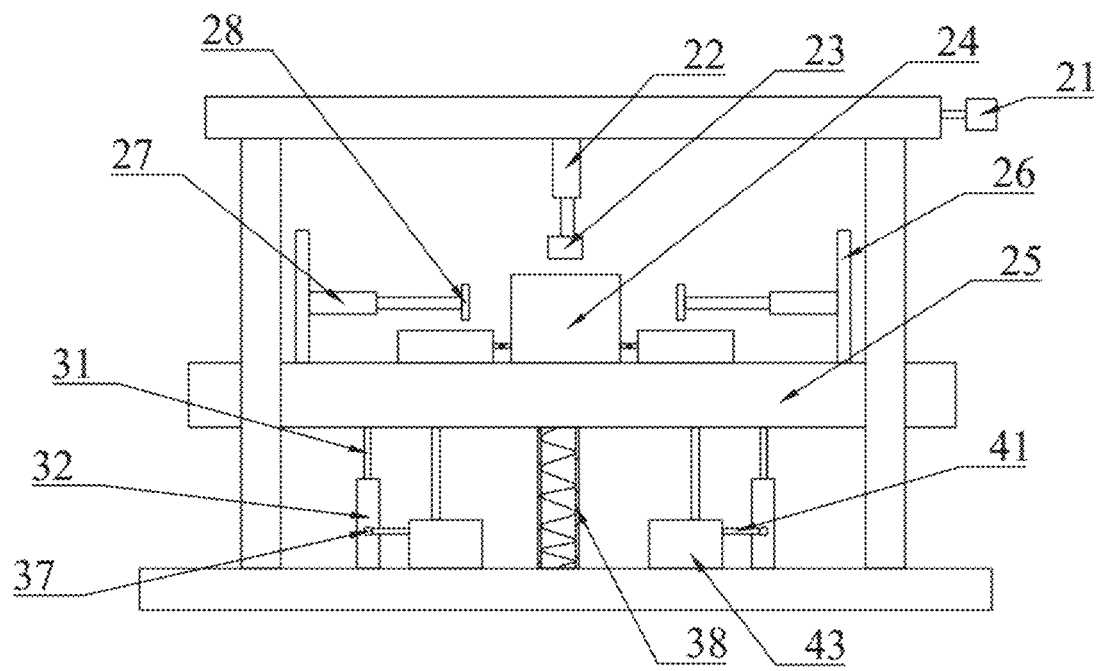
FIG. 3 is a schematic structural diagram of a mounting relationship between a mold and a lifting plate according to some embodiments of the present disclosure.

The mold 24 is a tool for making a metal to be forged into a complex-shaped component having a specific shape and a specific dimension under an external force. The shape and dimension of the mold 24 may be determined based on the shape and dimension of the complex-shaped component. FIG. 3 is a schematic structural diagram of a mounting relationship between a mold and a lifting plate according to some embodiments of the present disclosure. Referring to FIG. 3, the mold 24 may be a cuboid that is hollow inside and does not include an upper surface. The work table 25 is an operating platform for the forging process.

Figure 4:
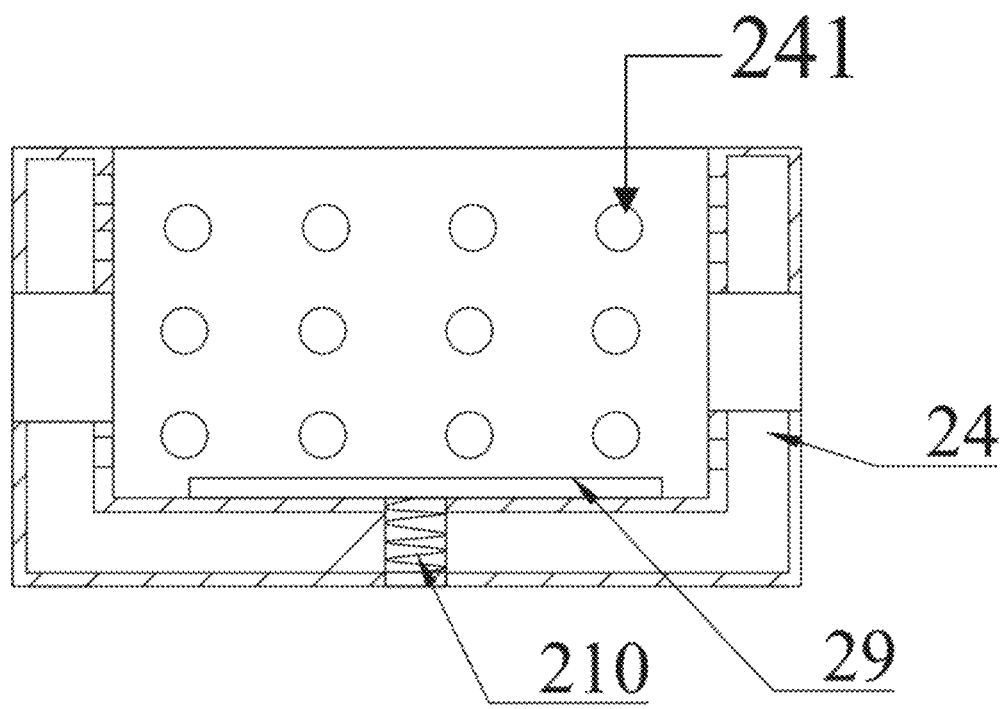
FIG. 4 is a schematic diagram of an internal structure of a mold according to some embodiments of the present disclosure.

FIG. 4 is a schematic diagram of the internal structure of a mold according to some embodiments of the present disclosure. Referring to FIG. 3 and FIG. 4, a plurality of sets of through holes 241 are uniformly disposed on an inner surface of the mold 24. The through holes 241 allow cold air blown from the cleaning unit 4 to enter an interior of the mold 24. Further description of the cleaning unit 4 cooling the air and blowing the air into the mold 24 may be found in the related descriptions of FIG. 4 and FIG. 5.

In some embodiments of the present disclosure, the plurality of sets of through holes 241 are uniformly disposed on the inner surface of the mold 24, which facilitates purging and cleaning of impurities and dust remaining on the surface of the mold 24 after the processing is completed, thereby avoiding surface defects such as scratches and pits that may appear during the next processing of the metal processed part and affect an appearance quality of a product.

In some embodiments of the present disclosure, a surface of one end of the work table 25 that is near the horizontal base is fixedly connected to the cushioning unit 3, and the cleaning unit 4 is fixedly mounted on a surface of one end of the work table 25 that is far away from the horizontal base, which can cushion the work table during the forging process and remove impurities on the surface of the mold, which helps improve the stability of the shaping unit and enhance the quality of the forging process.

In some embodiments, the shaping unit 2 may include a vertical plate 26, a hydraulic rod 27, and the clamping block 28. Referring to FIG. 2, the vertical plate 26 is vertically fixedly mounted on the surface of the end of the work table 25 that is away from the horizontal base; a fixed end of the hydraulic rod 27 is fixedly mounted on a surface of a side of the vertical plate 26 that is close to the mold 24; a telescopic end of the hydraulic rod 27 is fixedly connected with the clamping block 28, and the clamping block 28 is slidingly connected with the mold 24.

The vertical plate 26 may be used to fix the hydraulic rod 27. There may be two vertical plates 26, and the vertical plates 26 are symmetrically provided with an axis of the work table 25 as the symmetry axis.

The hydraulic rod 27 is used to drive the clamping block 28. The hydraulic rod 27 may control the clamping block 28 to move closer to or further away from the mold 24 by extension and retraction of the telescopic end.

The clamping block 28 is used to clamp the metal to be forged in the mold 24. When the metal to be forged is placed into the mold 24, the telescopic end of the hydraulic rod 27 extends, thereby driving the clamping blocks 28 closer to each other to clamp the metal processed part in the mold 24.

In some embodiments of the present disclosure, in the process of metal forging, the clamping blocks 28 on both sides are used for follow-up loading, so as to avoid the internal metal turbulence and turbulence caused by excessive loading, so that the metal flow line is distributed in a shape-conforming manner, thereby improving the quality of the processed parts. The follow-up loading refers to optimizing the forging process by dynamically adjusting the load applied to the metal processed part by the clamping blocks 28 during the plastic deformation process to adapt to an actual situation of material flow and deformation.

In some embodiments, the shaping unit 2 may include a lifting plate 29 and a memory spring 210. Referring to FIG. 3 and FIG. 4, the lifting plate 29 is placed on an upper surface of one end of the mold 24 that is close to the work table 25, the mold 24 is provided with a rectangular slot at a bottom, the memory spring 210 is disposed in the rectangular slot, one end of the memory spring 210 is fixedly connected with the mold 24, the other end of the memory spring 210 is fixedly connected with a lower surface of the lifting plate 29, and the memory spring 210 is electrically connected with the cushioning unit 3.

The lifting plate 29 is used to lift the processed metal, and the memory spring 210 is used to push the lifting plate 29 upwardly.

According to some embodiments of the present disclosure, when the processing of the metal part is completed, the memory spring 210 receives an electric current and expands, thereby pushing the lifting plate 29 upwardly, and the processed metal can be lifted up, which makes it convenient to remove the processed part.

The cushioning unit 3 is used to reduce a vibration during the metal shaping process to avoid the vibration from affecting the shaping of the metal. Referring to FIG. 1, the cushioning unit 3 is fixedly mounted on an upper surface of one end of the frame 1 that is close to the horizontal base, the cushioning unit 3 is fixedly connected with the shaping unit 2.

In some embodiments, the cushioning unit 3 may include a connecting rod 31, a cylinder body 32, a profiled block 33, a half gear 34, a coil 35, an electromagnet 36, a round rod 37, and a spring cartridge 38.

Figure 5:
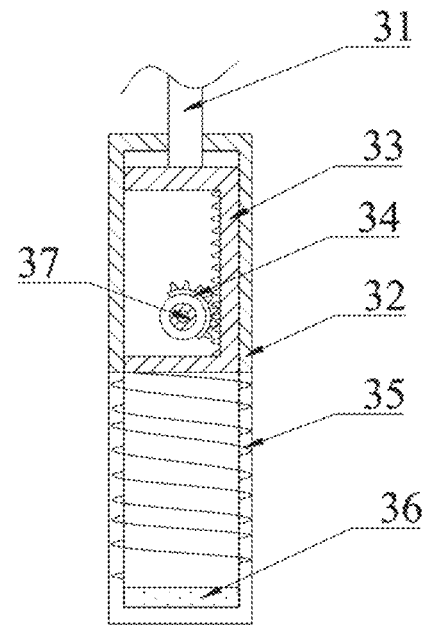
FIG. 5 is a schematic diagram of an internal structure of a cylinder body according to some embodiments of the present disclosure.

FIG. 5 is a schematic diagram of an internal structure of a cylinder body according to some embodiments of the present disclosure. Referring to FIG. 2 and FIG. 5, one end of the connecting rod 31 is fixedly connected with a surface of one end of the work table 25 that is close to the horizontal base, the other end of the connecting rod 31 extends into an interior of the cylinder body 32 and is fixedly connected with the profiled block 33, and the cylinder body 32 is fixedly mounted on the upper surface of the end of the frame 1 that is close to the horizontal base.

Referring to FIG. 5, a plurality of sets of teeth are disposed on an inner surface of the profiled block 33, and the profiled block 33 is connected with the half gear 34 by engaging the teeth.

Referring to FIG. 2 and FIG. 5, the half gear 34 is fixedly connected with one end of the round rod 37, the round rod 37 is rotationally mounted on the cylinder body 32, and the round rod 37 is fixedly connected with the cleaning unit 4. The round rod 37 is used to drive the cleaning unit 4.

Referring to FIG. 5, the cylinder body 32 includes an inner cylinder and an outer cylinder, the coil 35 is uniformly wrapped around an outer surface of the inner cylinder, and the electromagnet 36 is fixedly mounted on an inner surface of one end of the inner cylinder that is close to the horizontal base, the electromagnet 36 is electrically connected with one end of the coil 35, and the other end of the coil 35 is electrically connected with the memory spring 210.

Referring to FIG. 2, one end of the spring cartridge 38 is fixedly connected with the surface of the end of the work table 25 that is close to the horizontal base, and the other end of the spring cartridge 38 is fixedly connected to the upper surface of the end of the frame 1 that is close to the horizontal base.

The connecting rod 31 is used to connect the work table 25 to the profiled block 33. The profiled block 33 may move up and down along the cylinder body 32. When the extrusion block 23 extrudes the mold 24, the vibration generated by the work table 25 may extrude the connecting rod 31, which in turn causes the profiled block 33 to move downward along the cylinder body 32.

In some embodiments, a material of the profiled block 33 is a magnet.

According to some embodiments of the present disclosure, the material of the profiled block 33 is the magnet, which may generate a current to be transmitted to the electromagnet 36 when the profiled block 33 moves downward through the coil 35, so that the electromagnet 36 is of the same polarity as a lower portion of the profiled block 33 to provide a buffer to avoid exceeding an extrusion pressure to cause a damage to the device. In addition, after processing is completed, a current generated when the profiled block 33 moves upward is provided to the memory spring 210 to expand and elongate, so that the metal processed part is ejected from the mold 24, which is convenient to take out.

In some embodiments of the present disclosure, the profiled block 33 in the cylinder body 32 is connected to the work table 25 by the connecting rod 31, which may drive the profiled block 33 to move downward during forging and shaping.

The coil 35 is used to generate an induced electromotive force, which in turn generates a current in a closed circuit; the electromagnet 36 is of the same polarity as the profiled block 33, and the electromagnet 36 generates a repulsive force to block the profiled block 33 from moving downward, which in turn realizes a buffer for the work table 25.

In some embodiments of the present disclosure, when the extrusion block 23 extrudes the metal part in the mold 24, it drives the work table 25 to extrude the connecting rod 31, which causes the profiled block 33 to move downward along the inside of the cylinder body 32. As the profiled block 33 moves downward and is close to the coil 35, a count of magnetic lines of force passing through the coil 35 increases, and the magnetic flux increases. According to Faraday's law of electromagnetic induction, an induced electromotive force is generated in the coil 35, which in turn generates a current in the closed circuit. The current is delivered to the electromagnet 36 from a branch circuit, so that the electromagnet 36 is of the same polarity as the profiled block 33. The electromagnet 36 cooperates with the spring cartridge 38 to jointly block the downward movement of the profiled block 33 to realize a buffer for the work table 25. The greater the distance the profiled block 33 moves downward, and the more the turns of the coil 35 that the profiled block 33 passes through, the larger the current the coil 35 generates. Consequently, a repulsive force produced by the electromagnet 36 is also greater, preventing a scenario where a constant cushioning force is unable to accommodate the increased pressure applied by the extrusion block 23, thereby causing a damage to the device. On the other hand, the profiled block 33 moves downward while driving the half gear 34 to rotate clockwise so as to drive the cleaning unit 4 under the transmission of the round rod 37.

In some embodiments of the present disclosure, when the metal processes parts are produced, the motorized telescopic rod 22 contracts to drive the extrusion block 23 to move upward, and lift a pressure on the work table 25, thereby pushing the work table 25 and the profiled block 33 to move upward synchronously under an action of a restoring force of the spring cartridge 38. At the same time, the profiled block 33 moves away from the coil 35 and drives the half gear 34 to rotate counterclockwise. The current generated is delivered to the memory spring 210 from another branch, so that the memory spring 210 receives the current and expands, thus pushing the lifting plate 29 upward to lift up the metal processed parts, which is convenient for the processed parts to be taken down.

The cleaning unit 4 is used to clean the surface of the mold 24 after shaping. Referring to FIG. 1, the cleaning unit 4 is fixedly connected with the shaping unit 2 and the cushioning unit 3, respectively.

Figure 6:
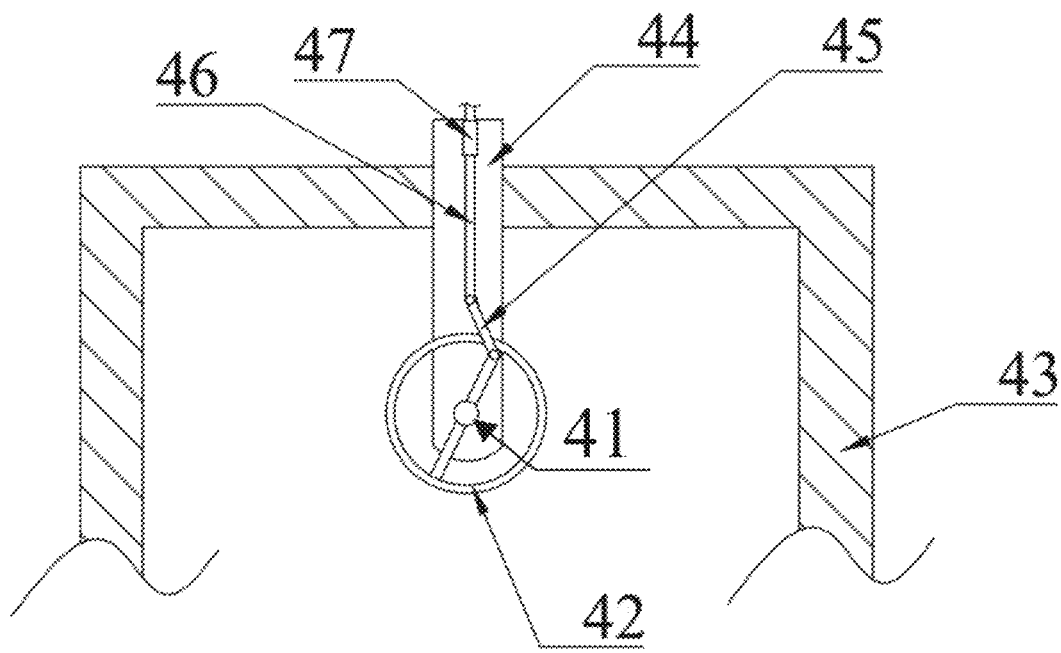
FIG. 6 is a schematic diagram of an internal structure of a mounting box according to some embodiments of the present disclosure.

In some embodiments, the cleaning unit 4 includes a long rod 41, an annular disk 42, and a mounting box 43. FIG. 6 is a schematic diagram of an internal structure of a mounting box according to some embodiments of the present disclosure. Referring to FIG. 2 and FIG. 6, one end of the long rod 41 is fixedly connected with the round rod 37 disposed on an exterior of the cylinder body 32, and the other end of the long rod 41 extends into the mounting box 43 and is fixedly connected with the annular disk 42 disposed in the mounting box 43, the long rod 41 is rotationally connected with the mounting box 43, and the mounting box 43 is fixedly mounted on the upper surface of the end of the frame 1 that is close to the horizontal base.

The long rod 41 is used to connect the round rod 37 to the annular disk 42. The mounting box 43 is used to mount other components that accommodate the cleaning unit 4.

In some embodiments of the present disclosure, by connecting the round rod 37 and the annular disk 42 by the long rod 41, the long rod 41 may drive the annular disk 42 to rotate under the transmission of the round rod 37.

In some embodiments, the cleaning unit 4 includes a limiting plate 44. Referring to FIG. 6, the mounting box 43 is provided with a slot on one side away from the horizontal base, and the limiting plate 44 is fixedly mounted on the slot of the mounting box 43.

In some embodiments, the cleaning unit 4 includes a straight rod 45, a mobile rod 46, and a limiting cylinder 47. Referring to FIG. 6, the mobile rod 46 is slidably mounted in the limiting cylinder 47, the limiting cylinder 47 is fixedly mounted on the limiting plate 44, and the annular disk 42 is rotationally connected to one end of the mobile rod 46 through the straight rod 45.

The limiting plate 44 is used to fix the limiting cylinder 47.

The straight rod 45 is used to connect the annular disk 42 with the mobile rod 46. The limiting cylinder 47 is used to restrict the position and sliding direction of the mobile rod 46, and the mobile rod 46 may move up and down along the limiting cylinder 47 under an action of the straight rod 45.

In some embodiments of the present disclosure, the annular disk 42 is rotationally connected to one end of the mobile rod 46 through the straight rod 45, and when the half gear 34 is rotated clockwise, the annular disk 42 may be driven to rotate clockwise under the transmission effect of the long rod 41, so as to drive the mobile rod 46 to move downward along the limiting cylinder 47 under the action of the straight rod 45.

Figure 7:
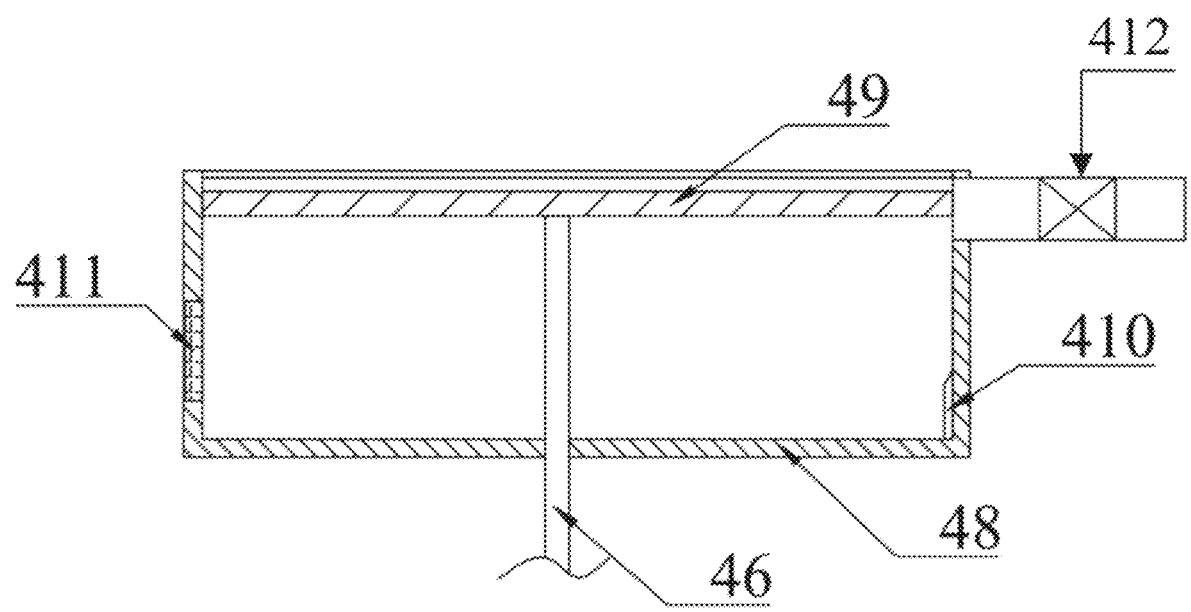
FIG. 7 is a schematic diagram of a structure of an air box according to some embodiments of the present disclosure.

In some embodiments, the cleaning unit 4 includes an air box 48 and a push plate 49. FIG. 7 is a schematic diagram of a structure of an air box according to some embodiments of the present disclosure. Referring to FIG. 7, the air box 48 is fixedly mounted on the surface of the end of the work table 25 that is away from the horizontal base; the other end of the mobile rod 46 extends into the air box 48 and is fixedly connected with the push plate 49; and the push plate 49 is slidably mounted in the air box 48.

The air box 48 is a container for extracting and discharging air. The push plate 49 may move up and down driven by the mobile rod 46.

In some embodiments of the present disclosure, by slidingly mounting the push plate 49 in the air box 48, extracted outside air may enter the air box 48 as the push plate 49 is moved downward, which facilitates subsequent cleaning of the mold 24.

In some embodiments, a diameter of the annular disk 42 is the same as a maximum amount of travel of the push plate 49.

In some embodiments of the present disclosure, when the half gear 34 completes the full-tooth rotation, it can drive the annular disk 42 to rotate for half a week, thereby driving the push plate 49 to move downwardly or upwardly to fill the air inside the air box 48 or discharge the air, so as to avoid that the air inside the air box 48 after cooling cannot be fully utilized and causes waste. At the same time, discharging all the air may accelerate a cooling rate of the mold 24, and also clean the dust and impurities on the surface of the mold 24 more thoroughly.

In some embodiments, the cleaning unit 4 includes a switch 410 and a refrigeration plate 411. Referring to FIG. 7, the switch 410 is fixedly mounted in an inner wall of the air box 48 that is parallel to a vertical direction, and the refrigeration plate 411 is fixedly mounted in another inner wall of the air box 48 that is parallel to the vertical direction, the switch 410 being electrically connected with the refrigeration plate 411.

The switch 410 is used to control the activation or deactivation of the refrigeration plate 411. The refrigeration plate 411 is used to cool the extracted air.

In some embodiments of the present disclosure, when the half gear 34 rotates clockwise, the annular disk 42 may be driven to rotate clockwise under the transmission effect of the long rod 41, thereby driving the mobile rod 46 to move downward along the limiting cylinder 47 under the action of the straight rod 45. At this time, the mobile rod 46 pulls the push plate 49 to move downward to extract the outside air into the air box 48, the push plate 49 moves downward to press the switch 410, thus starting the refrigeration plate 411 to cool the air inside the air box 48. When the half gear 34 rotates counterclockwise, the annular disk 42 may be driven to rotate counterclockwise under the transmission effect of the long rod 41, thereby driving the mobile rod 46 to move upward along the limiting cylinder 47 under the action of the straight rod 45. At this time, the mobile rod 46 pushes the push plate 49 to move upward, blows the cold air inside the air box 48 from a pipe to the interior of the mold 24 to cool down the mold 24. By blowing cold air into the mold 24 to cool down the mold 24, it can avoid scalding the staff while blowing off impurities and dust on the surface of the mold 24, thereby preventing impurities from affecting a quality of a surface of a next metal processed part.

In some embodiments, referring to FIG. 7, the air box 48 is connected to an interior of the mold 24 in conduction through a pipe, the pipe being provided with a plurality of sets of check valves 412, the check valves 412 being disposed on a surface of one end of the air box 48 that is away from the horizontal base.

In some embodiments of the present disclosure, by providing the check valves 412 in the pipe connecting the air box 48 and the mold 24, the check valves 412 may be opened to clean the mold 24 after the metal shaping is completed, and the check valves 412 may be closed after the cleaning is completed, improving the effectiveness of cleaning the mold 24.

In some embodiments of the present disclosure, by using the device for controllable forging of a forming flow line of a complex-shaped component, after the metal is placed into the mold 24 and at the same time as the shaping unit 2 extrudes the metal, the vibration generated by the work of the shaping unit 2 can be offset by the cushioning unit 3, thereby avoiding affecting the shaping process on the metal. After the processing is completed, the cleaning unit 4 will clean the dust and impurities from the surface of the mold 24, thereby helping to avoid impurities from affecting the quality of the surface of the next metal processed part.

In some embodiments, the method for controllable forging of a forming flow line of a complex-shaped component may be accomplished by using the device for controllable forging of a forming flow line of a complex-shaped component (such as the structure shown in FIG. 1).

In some embodiments, the method for controllable forging of a forming flow line of a complex-shaped component may include: wrapping a metal to be forged in a cavity of a mold for molding, the metal to be forged being heated prior to molding and maintained at an initial forging temperature for a predetermined period of time; controlling a hydraulic rod to extend to drive a clamping block to clamp the metal to be forged in the mold, starting a telescopic motor to drive a motorized telescopic rod to move to a top of the mold, and the motorized telescopic rod extending to drive an extrusion block to extrude the metal to be forged to obtain a shaped metal, performing shock absorption on a shaping unit by a cushioning unit during an extrusion process; removing and cooling the shaped metal; and cleaning impurities and dust of the cooled metal through a cleaning unit.

The metal to be forged refers to a metal that needs to be forged. In some embodiments, after the metal to be forged is heated and maintains an initiation forging temperature for a predetermined time period, the metal to be forged may be encased in a cavity of the mold for molding. The predetermined time period may be determined based on an actual situation. For example, the predetermined time period may be 20 minutes to 40 minutes, etc. Related descriptions of the mold may be found in FIG. 1, FIG. 2, and FIG. 3 and related descriptions thereof.

In some embodiments, a controller may control the hydraulic rod to extend to drive the clamping blocks to clamp the metal to be forged in the mold, start the telescopic motor to drive the motorized telescopic rod to move to a top of the mold, and the motorized telescopic rod may extend to drive the extrusion block to extrude the metal to be forged to obtain a shaped metal, and shock absorption may be performed on the shaping unit by the cushioning unit during an extrusion process.

An exemplary extrusion process may include: the extrusion block extruding the metal to be forged downwardly while the clamping blocks on two sides are follow-up loaded along with the extrusion block, the extrusion block continuously extruding the metal to be forged, and the clamping blocks on two sides axially extruding to perform an upsetting action until an upsetting stroke is completely in place, and maintaining for 20 seconds.

In some embodiments, when the metal to be forged is put into the mold, the controller controls the hydraulic rod to extend to drive the clamping blocks close to each other to clamp the metal processed part in the mold, and at the same time, controls the telescopic motor to start, thereby driving the motorized telescopic rod to move directly above the mold. The motorized telescopic rod extends to drive the extrusion blocks to extrude the metal processed part so that the deformation of the metal to be forged is always in a compressive stress state in three directions, thereby improving the plasticity of the metal and reducing the internal tensile stress of the processed part. The clamping blocks on both sides are used for follow-up loading, so as to avoid the internal metal turbulence and turbulence caused by excessive loading, so that the metal flow line is distributed in a shape-conforming manner, thereby improving the quality of the processed parts.

In some embodiments, when the extrusion block extrudes the metal to be forged in the mold, it drives the work table to extrude the connecting rod, which causes the profiled block to move downward along the inside of the cylinder body. As the profiled block moves downward and is close to the coil, a count of magnetic lines of force passing through the coil increases, and the magnetic flux increases. According to Faraday's law of electromagnetic induction, an induced electromotive force is generated in the coil, which in turn generates a current in the closed circuit. The current is delivered to the electromagnet from a branch circuit, so that the electromagnet is of the same polarity as the profiled block. The electromagnet cooperates with the spring cartridge to jointly block the downward movement of the profiled block to realize a buffer for the work table. The greater the distance the profiled block moves downward, and the more the turns of the coil that the profiled block passes through, the larger the current the coil generates. Consequently, a repulsive force produced by the electromagnet is also greater, preventing a scenario where a constant cushioning force is unable to accommodate the increased pressure applied by the extrusion block, thereby causing a damage to the device. The description of the cushioning unit, the shaping unit, and components thereof may be found in FIG. 1, FIG. 2, FIG. 3, FIG. 4, and FIG. 5 and related descriptions thereof.

In some embodiments, the lifting plate may lift the shaped metal to facilitate the removal of the shaped metal. The finished shaped metal may be cooled by natural cooling or by cold air blown by the cleaning unit. For more details, please refer to the following description.

In some embodiments, when the metal processed part is produced, the motorized telescopic rod contracts to drive the extrusion block to move upward and relieves the pressure on the work table, thereby pushing the work table and the profiled block to move upward synchronously under the action of the restoring force of the spring cartridge. At the same time, the profiled block moves away from the coil and drives the half gear to rotate counterclockwise. The current generated is delivered to the memory spring from another branch, so that the memory spring receives the current and expands, thus pushing the lifting plate upward to lift up the metal processed parts, which is convenient for the processed parts to be taken down.

In some embodiments, the cleaning unit may clean impurities and dust of the cooled metal. Related descriptions of the cleaning unit and its components may be found in FIG. 1, FIG. 6, and FIG. 7 and related descriptions thereof.

In some embodiments, while the profiled block moves downward, it drives the half gear to rotate clockwise, the annular disk is driven to rotate clockwise under the transmission effect of the long rod, thereby driving the mobile rod to move downward along the limiting cylinder under the action of the straight rod. At this time, the mobile rod pulls the push plate down to extract outside air into the air box. When the half gear rotates counterclockwise, the annular disk is driven to rotate counterclockwise under the transmission effect of the long rod, thereby driving the mobile rod to move upward along the limiting cylinder under the action of the straight rod. At this time, the mobile rod pushes the push plate to move upward, blows the cold air inside the air box from a pipe to the interior of the mold to cool down the mold, which can avoid scalding the staff while blowing off impurities and dust on the surface of the mold, thereby preventing impurities from affecting the quality of the surface of the next metal processed part.

Some embodiments of the present disclosure, by performing absorption on the shaping unit during the shaping process of the metal to be forged, can avoid the impact of device shaking on the quality of the extrusion process, improve the plasticity of the forged metal, make the metal flow line to be distributed in a shape-conforming manner, and protect the stability of the forging device while improving the forging quality. Furthermore, by cleaning the shaping unit through the cleaning unit after forging, a good working environment can be maintained, thereby avoiding affecting the quality of the surface of the next metal processed part.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or collocation of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A device for controllable forging of a forming flow line of a shaped component, comprising:
   a frame, a shaping unit, a cushioning unit, and a cleaning unit;
   wherein the frame is configured to be placed on a horizontal base, the shaping unit is slidably mounted on the frame, the cushioning unit is fixedly mounted on an upper surface of one end of the frame that is adjacent to the horizontal base, the cushioning unit is fixedly connected with the shaping unit, and the cleaning unit is fixedly connected with the shaping unit and the cushioning unit, respectively; and wherein the shaping unit comprises a mold including a lifting plate, and a memory spring fixedly connected to the lifting plate and electrically connected to the cushioning unit.

2. The device according to claim 1, wherein the shaping unit includes a telescopic motor, a motorized telescopic rod, and an extrusion block; a fixed end of the telescopic motor is fixedly mounted on a surface of one end of the frame that is away from the horizontal base, a telescopic end of the telescopic motor is fixedly connected with a fixed end of the motorized telescopic rod, and a telescopic end of the motorized telescopic rod is fixedly connected with the extrusion block.

3. The device according to claim 2, wherein the shaping unit includes a work table; the mold is fixedly mounted on the work table, and a surface of one end of the work table that is closer to the horizontal base than another end of the work table is fixedly connected with the cushioning unit, and a surface of one end of the work table that is away from the horizontal base is fixedly mounted with the cleaning unit.

4. The device according to claim 3, wherein a plurality of sets of through holes are uniformly opened on an inner surface of the mold.

5. The device according to claim 3, wherein the shaping unit includes a vertical plate, a hydraulic rod, and a clamping block; the vertical plate is vertically fixedly mounted on the surface of the end of the work table that is away from the horizontal base; a fixed end of the hydraulic rod is fixedly mounted on a surface of a side of the vertical plate that is closer to the mold than another side of the vertical plate; a telescopic end of the hydraulic rod is fixedly connected with the clamping block.

6. The device according to claim 5, wherein the lifting plate is placed on an upper surface of one end of the mold that is closer to the work table than another end of the mold, the mold is provided with a rectangular slot at a bottom of the mold, the memory spring is disposed in the rectangular slot, one end of the memory spring is fixedly connected with the mold, the other end of the memory spring is fixedly connected with a lower surface of the lifting plate.

7. The device according to claim 6, wherein the cushioning unit includes a connecting rod, a cylinder body, and a profiled block; one end of the connecting rod is fixedly connected with the surface of the end of the work table that is closer to the horizontal base, the other end of the connecting rod extends into an interior of the cylinder body and is fixedly connected with the profiled block, and the cylinder body is fixedly mounted on the upper surface of the end of the frame that is adjacent to the horizontal base.

8. The device according to claim 7, wherein a material of the profiled block is a magnet.

9. The device according to claim 7, wherein the cushioning unit includes a half gear; a plurality of sets of teeth are disposed on an inner surface of the profiled block, and the profiled block is connected with the half gear by engaging the teeth.

10. The device according to claim 9, wherein the cushioning unit includes a round rod; the half gear is fixedly connected with one end of the round rod, the round rod is rotationally mounted on the cylinder body, and the round rod is fixedly connected with the cleaning unit.

11. The device according to claim 10, wherein the cushioning unit includes a coil and an electromagnet; the cylinder body includes an inner cylinder and an outer cylinder, the coil is uniformly wrapped around an outer surface of the inner cylinder, and the electromagnet is fixedly mounted on an inner surface of one end of the inner cylinder that is closer to the horizontal base than another end of the inner cylinder, the electromagnet is electrically connected with one end of the coil, and another end of the coil is electrically connected with the memory spring.

12. The device according to claim 11, wherein the cushioning unit includes a spring cartridge; one end of the spring cartridge is fixedly connected with the surface of the end of the work table that is close to the horizontal base, and the other end of the spring cartridge is fixedly connected to the upper surface of the end of the frame that is adjacent to the horizontal base.

13. The device according to claim 12, wherein the cleaning unit includes a rod, an annular disk, and a mounting box; one end of the rod is fixedly connected with the round rod disposed on an exterior of the cylinder body, and the other end of the rod extends into the mounting box and is fixedly connected with the annular disk disposed in the mounting box, the rod is rotationally connected with the mounting box, and the mounting box is fixedly mounted on the upper surface of the end of the frame that is adjacent to the horizontal base.

14. The device according to claim 13, wherein the cleaning unit includes a limiting plate; the mounting box is provided with a slot on one side away from the horizontal base, and the limiting plate is fixedly mounted in the slot of the mounting box.

15. The device according to claim 14, wherein the cleaning unit includes a straight rod, a mobile rod and a limiting cylinder; the mobile rod is slidably mounted in the limiting cylinder, the limiting cylinder is fixedly mounted on the limiting plate, and the annular disk is rotationally connected to one end of the mobile rod via the straight rod.

16. The device according to claim 15, wherein the cleaning unit includes an air box and a push plate; the air box is fixedly mounted on the surface of the end of the work table that is away from the horizontal base; the other end of the mobile rod extends into the air box and is fixedly connected with the push plate; and the push plate is slidably mounted into the air box.

17. The device according to claim 16, wherein a diameter of the annular disk is the same as a maximum amount of travel of the push plate.

18. The device according to claim 16, wherein the cleaning unit includes a switch and a refrigeration plate; the switch is fixedly mounted in an inner wall of the air box that is parallel to a vertical direction, and the refrigeration plate is fixedly mounted in another inner wall of the air box that is parallel to the vertical direction, the switch being electrically connected with the refrigeration plate.

19. The device according to claim 16, wherein the air box is connected to an interior of the mold by a pipe, the pipe being provided with a plurality of sets of check valves, the check valves being disposed on a surface of one end of the air box that is away from the horizontal base.

20. A method for controllable forging of a forming flow line of a shaped component, comprising:
wrapping a metal to be forged in a cavity of a mold for molding, the metal to be forged being heated prior to molding and maintained at an initial forging temperature for a predetermined period of time;

controlling a hydraulic rod to extend to drive a clamping block to clamp the metal to be forged in the mold, starting a telescopic motor to drive a motorized telescopic rod to move to a top of the mold, and the motorized telescopic rod extending to drive an extrusion block to forge the metal to be forged to obtain a shaped metal, performing shock absorption on a shaping unit by a cushioning unit during the controllable forging, wherein the shaping unit comprises a mold including a lifting plate, and a memory spring fixedly connected to the lifting plate and electrically connected to the cushioning unit;

removing and cooling the shaped metal; and cleaning impurities and dust of the cooled metal by a cleaning unit.

* * * * *